Patented Jan. 5, 1937

2,066,543

UNITED STATES PATENT OFFICE 2,066,543

REFRACTORY BODIES

Gilbert E. Seil, Cynwyd, Pa., assignor to E. J. Lavino and Company, Philadelphia, Pa., a corporation of Delaware No Drawing. Application April 10, 1936, Serial No. 73,715

5 Claims. (Cl. 106—9)

This invention relates to the treatment of chrome ore and has for its major objects, (1) the ultimate production of a refractory body or brick having novel as well as superior characteristics, and (2) the production from chrome ore of an improved substance suitable for use as a starting material for making such a refractory body.

There has been described in my Letters Patent 2,028,018 and in my co-pending patent application, Serial No. 44,463 of October 10, 1935 and in my Patent No. 2,037,600 of April 14, 1936, a refractory material prepared by the preliminary heat treatment of chrome ore at a relatively high temperature and with the addition of periclase (MgO) wherein the periclase is used as a corrective for bolstering the secondary component of the chrome ore (made up of various magnesium silicates) either during such heat treatment or during a subsequent treatment, by virtue of which there is formed around the particles of chromite which comprise the primary component of the chrome ore, a bonding material of forsterite ($2MgO.SiO_2$).

This forsterite is formed in carrying out said process by a reaction between the low melting point magnesium silicates which comprise the secondary component or gangue of the chrome ore, and the magnesia of the periclase. That is, the original magnesium silicates of the chrome ore are composed of magnesia and silica wherein the magnesia varies molecularly from two-thirds to one-and-a-half times the silica in the original mineral. When this is corrected, as above outlined by the addition of periclase, the magnesia in the forsterite is molecularly twice as much as the silica.

The forsterite so formed, together with the excess of periclase, normally used for bolstering purposes, crystallizes with the crystals thereof having all three of their dimensions essentially equal or of the same magnitude which is useful as a bond under certain conditions, whereas this invention shows how to produce a bond from the secondary component of the chrome ore having different habits of crystallization.

So to form a novel type of bond is one particular object of this invention, which object is realized by reacting upon the deleterious secondary component of the crude chrome ore by converting it into a substance comprising a mass of interlocking crystals which tend to build a definite supporting or reinforcing structure about the chromite grog. Thus a paramount factor of this invention is to treat chrome ore for making it usable as a refractory material by bringing about the conversion of a quantity of the magnesium-silicates of the gangue of the ore into crystalline pressure-resisting refractory oxide substances of the general type comprising magnesium-aluminate and aluminium-silicate combinations.

This effect can be realized by providing enough alumina to meet the theoretical chemical requirements with respect to the molecules of the magnesia of the secondary component or gangue, and with respect to the molecules of the silica of the gangue, under appropriate and controlled heat conditions for converting the gangue of the ore being treated selectively into spinel ($MgO.Al_2O_3$), and into mullite ($3Al_2O_3.2SiO_2$); or possibly into substances of similar type. For instance, if there is provided under proper heat conditions one molecule of alumina for each molecule of magnesia in the gangue and one-and-a-half molecules of alumina for each molecule of silica, there is formed spinel which crystallizes as a dendrite and is so formed in the mass that it tends to hold together the individual particles of the primary component chromite, and there is also formed mullite as long needle-like crystals which interlock and conjointly build about the chromite grog a definite reinforcing structure.

Theoretically these additions under ideal conditions will yield the results stated, but in practice, it is found that larger amounts of alumina must be added so that all of the magnesium silicate occurring as the secondary component in the ore is converted into one or the other of the two crystalline substances mentioned. But in order to accomplish this effect, the impurities occurring in the ore must be taken into consideration and also any impurities in the alumina that is used as the correcting agent. That is, if the alumina used in preparing this novel refractory material contains silica, sufficient additional alumina must be added from the practical, and not from the theoretical standpoint, so that such silica occurs in the finished refractory material in the form of mullite.

While this teaching shows how to convert the secondary component of the chrome ore into a novel, advantageous and useful form, it is still desirable to control the distribution thereof with respect to the chromite particles so that there is no undue concentration thereof but that it is homogeneously dispersed throughout the chromite and as far as possible to have the reformed component in the form of an infinitesimally thin layer or film surrounding or adsorbed by each chromite particle. This can be accomplished by exposing the crude chrome ore to a heat treatment (as described in my Letters Patent 2,028,-017), preferably in a rotary kiln, to a temperature of at least 3100° F. but preferably to 3400° F., whereupon after cooling, a physical rearrangement of the secondary component will be found to have taken place. That is, each crystal or particle of chromite is enveloped in a very thin coating of gangue or secondary component so that in the treated chrome ore there is no zone or point of weakness due to a colony or unequal accumulation of particles of the secondary component. But even though the secondary component be evenly distributed around and among the chromite particles, it is desirable to convert this secondary component into a substance that is still more suitable for refractory purposes, namely, that more nearly approaches the refractory qualities of the chromite. To that end, this is done by the chemical conversion as above described. This can be accomplished by adding the alumina to the crude chrome ore prior to the recrystallizing heat treatment thereof, by virtue of which the redistributing and recrystallizing of the secondary component proceeds concurrently, or substantially so, with the chemical conversion of the magnesium and silica constituents thereof into a refractory oxide of a high melting point. While desirable, it is not essential to the practice of this invention that the recrystallization and the chemical conversion shall take place concurrently because the recrystallization and the conversion can be caused to take place in sequence by properly heat treating a mingled mixture of treated chrome ore and the necessary amount of alumina. Thereafter, the resulting product is ground and made into refractory bricks in the usual way such as by tempering, shaping and finally burning. Or, an incomplete amount of alumina can be added to the ore before recrystallizing heat treating and the remaining necessary amount of the alumina can be added to the mix before mixing and tempering. That is, the recrystallized and converted chrome ore can be formed into refractory bricks by the refractory material maker, or the recrystallized and partially converted chrome material can be sold by the maker to a user who can complete the conversion and make the material into refractory bricks.

Consider now the following melting points of the secondary components in heat treated recrystallized chrome ore—periclase—alumina mixtures:

| | #MgO | #SiO$_2$ | #Al$_2$O$_3$ | Melting points |
|---|---|---|---|---|
| Mix 1: | | | | |
| 1000# treated chrome ore | 40 | 60 | -------- | |
| 300# alumina | -------- | 21 | 270 | 3326° F.—1830° C. |
| | 40 (10.2%) | 81 (20.7%) | 270 (69.1%) | |
| Mix 2: | | | | |
| 1000# treated chrome ore | 40 | 60 | -------- | |
| 50# periclase | 45 | 3 | -------- | |
| 100# alumina | -------- | 7 | 90 | 3326° F.—1830° C. |
| | 85 (35%) | 70 (29%) | 90 (36%) | |
| Mix 3: | | | | |
| 1000# treated chrome ore | 40 | 60 | -------- | |
| 150# periclase | 135 | 9 | -------- | |
| 150# alumina | -------- | 10 | 135 | |
| | 175 (45%) | 79 (20%) | 135 (35%) | 3488° F.—1920° C. |
| Mix 4: | | | | |
| 1000# treated chrome ore | 40 | 60 | -------- | |
| 300# alumina | -------- | 21 | 270 | |
| 100# periclase | 90 | 6 | -------- | |
| | 130 (27%) | 87 (18%) | 270 (55%) | 3614° F.—1990° C. |
| Mix 5: | | | | |
| 1000# treated chrome ore | 40 | 60 | -------- | |
| 300# alumina | -------- | 21 | 270 | |
| 150# periclase | 135 | 9 | -------- | |
| | 175 (33%) | 90 (17%) | 270 (50%) | 3632° F.—2000° C. |

It will be observed that these melting points are in a desirable range of temperatures for use in refractories and are not as high as the melting points of the secondary components of chrome ore bolstered with periclase plus kyanite (Al$_2$O$_3$.SiO$_2$) wherein:

| | #MgO | #SiO$_2$ | #Al$_2$O$_3$ | Melting points |
|---|---|---|---|---|
| Mix 6: | | | | |
| 77½# treated chrome ore | 3.10 | 4.65 | -------- | |
| 22½# periclase | 20.25 | 1.08 | 0.07 | |
| 3# kyanite | -------- | .90 | 1.95 | |
| | 23.35 (73.0%) | 6.63 (20.7%) | 2.02 (6.3%) | 4154° F.—2290° C. |
| Mix 7: | | | | |
| 77½# treated chrome ore | 3.10 | 4.65 | -------- | |
| 22½# periclase | 20.25 | 1.08 | 0.07 | |
| 6# kyanite | -------- | 1.80 | 3.90 | |
| | 23.35 (67.0%) | 7.53 (21.6%) | 3.97 (11.4%) | 3974° F.—2190° C. |
| Mix 8: | | | | |
| 77½# treated chrome ore | 3.10 | 4.65 | -------- | |
| 22½# periclase | 20.25 | 1.08 | 0.07 | |
| 9# kyanite | -------- | 2.70 | 5.85 | |
| | 23.35 (62%) | 8.43 (21%) | 5.92 (17%) | 3812° F.—2100° C. |
| Mix 9: | | | | |
| 77½# treated chrome ore | 3.10 | 4.65 | -------- | |
| 22½# periclase | 20.25 | 1.08 | 0.07 | |
| 12# kyanite | -------- | 3.60 | 7.80 | |
| | 23.25 (58%) | 9.33 (23%) | 7.87 (19%) | 3614° F.—1990° C. | so it can be seen that by the use of this invention the secondary component of the treated chrome ore can be controllably converted into a magnesium-aluminum combination having a melting point within a desired range.

There follows a comparison of the melting points of the secondary components in mixtures of or combinations with chrome ores, periclase, alumina and kyanite:

*Melting points of secondary components in chrome ore—periclase—alumina mixtures*

| Mix No. | Composition of mix | | | |
|---|---|---|---|---|
| | Chrome ore | Periclase | Alumina | Kyanite |
| 10 | 1000# | -------- | 300# | -------- |
| 11 | 1000# | 50# | 100# | -------- |
| 12 | 1000# | 150# | 150# | -------- |
| 13 | 1000# | 100# | 300# | -------- |
| 14 | 1000# | 150# | 300# | -------- |
| 15 | 775# | 225# | -------- | 30# |
| 16 | 775# | 225# | -------- | 60# |
| 17 | 775# | 225# | -------- | 90# |
| 18 | 775# | 225# | -------- | 120# |
| 19 | 1000# | -------- | -------- | -------- |
| 20 | 900# | 100# | -------- | -------- |
| 21 | 875# | 125# | -------- | -------- |
| 22 | 775# | 225# | -------- | -------- |

*Secondary component*

| Analysis | | | Melting point | |
|---|---|---|---|---|
| MgO | SiO$_2$ | Al$_2$O$_3$ | Degrees F. | Degrees C. |
| *Percent* | *Percent* | *Percent* | | |
| 10.2 | 20.7 | 69.1 | 3326 | 1830 |
| 35.0 | 29.0 | 36.0 | 3326 | 1830 |
| 45.0 | 20.0 | 35.0 | 3488 | 1920 |
| 27.0 | 18.0 | 55.0 | 3614 | 1990 |
| 33.0 | 17.0 | 50.0 | 3632 | 2000 |
| 73.0 | 20.7 | 6.3 | 4154 | 2290 |
| 67.0 | 21.6 | 11.4 | 3974 | 2190 |
| 62.0 | 21.0 | 17.0 | 3812 | 2100 |
| 58.0 | 23.0 | 19.0 | 3614 | 1990 |
| 40.0 | 60.0 | -------- | 2840 | 1560 |
| 67.5 | 32.5 | -------- | 3686 | 2030 |
| 70.5 | 29.5 | -------- | 3830 | 2110 |
| 78.9 | 21.1 | -------- | 4316 | 2380 |

The following illustration is given for the calculation of the theoretical amount of alumina required to correct a thousand pounds of treated chrome ore, remembering that the molecular weight of silica is 60.; of periclase is 40.; and of alumina is 102. In one thousand pounds of treated chrome ore there is 60.4# of silica MgO combined with SiO$_2$ as MgO.SiO$_2$  40:60=#MgO:60.4
$$\#MgO = \frac{40}{60} \times 60.4 = 40.3$$

Necessary Al$_2$O$_3$ to correct 60.4# SiO$_2$ forming 3Al$_2$O$_3$.2SiO$_2$ $$3(102):2(60) = \#Al_2O_3:60.4$$
$$\#Al_2O_3 = \frac{306}{102} \times 60.4 = 153.7$$

Necessary Al$_2$O$_3$ to correct 40.3# MgO forming MgO.Al$_2$O$_3$ $$40:102 = 40.3: \#Al_2O_3$$
$$\#Al_2O_3 = \frac{102}{40} \times 40.3 = 102.7$$

Total theoretical requirements of alumina for one thousand pounds of chrome ore is 153.7 plus 102.7 pounds, or 256.4 pounds of alumina.

The composition of the finished refractory will depend upon the amounts of correctives added. For example, if the MgO is in molecular excess over the molecular sum of the Al$_2$O$_3$ plus the SiO$_2$, the resulting products will be MgO.Al$_2$O$_3$ (spinel), 2MgO.SiO$_2$ (forsterite) and MgO (periclase). If, however, the Al$_2$O$_3$ is in molecular excess over the molecular sum of the MgO plus the SiO$_2$, the resulting products will be MgO.Al$_2$O$_3$ (spinel), 3Al$_2$O$_3$.2SiO$_2$ (mullite) and Al$_2$O$_3$ (crystalline alumina).

A study of the tabulations and descriptions herein shows many combinations are possible and that this invention includes the following modes of obtaining the novel products hereof.

1.—Raw ore to which alumina is added at the wet pan, the material afterwards being pressed and burned in the regular manner.

2.—Raw ore to which both alumina and magnesia are added at the wet pan, the material afterwards being pressed and burned in the regular manner.

3.—Heat treated recrystallized chrome ore to which alumina is added at the wet pan, the material afterwards being pressed and burned in the regular manner.

4.—Heat treated recrystallized chrome ore to which both alumina and magnesia are added at the wet pan, the material afterwards being pressed and burned in the regular manner.

5.—Heat treated recrystallized chrome ore, to which all or part of the required alumina has been added before treatment, which is then ground, and to which the balance of the alumina, if any, and the periclase, if any, are added at the wet pan, after which the mixture is pressed and burned in the regular manner.

6.—Heat treated recrystallized chrome ore, to which all or part of the required magnesia has been added before treatment, which is then ground, and to which the balance of the magnesia, if any, and the alumina are added at the wet pan, after which the mixture is pressed and burned in the regular manner.

7.—Heat treated recrystallized chrome ore, to which both the alumina and the periclase have been added before treatment, which is then ground, tempered, pressed and burned in the regular manner.

To reiterate, the deleterious secondary component in the chromite is magnesium silicate of a low melting point, which by the practice of this invention can be completely decomposed and there is formed from the magnesium released by the decomposition, a spinel that is as refractory relatively as chromite. After the formation of the magnesium aluminate, the silica reacts with the excess of alumina and forms mullite. The mullite occurs in the form of long needles and serves as a novel bonding agent in the new refractory.

I claim:

1. A refractory starting material comprising chromite, spinel and mullite.

2. The process of making a refractory starting material from chrome ore which comprises bringing about a reaction between the magnesium silicate of the secondary component of the ore and alumina by virtue of which reaction products are realized constituting spinel and mullite.

3. The process of making a refractory starting material from raw chrome ore which comprises exposing chrome ore and a quantity of alumina for a time to a temperature of at least 3100° F. followed by cooling by virtue of which the magnesium silicate secondary component of the ore has been chemically converted into crystalline spinel and mullite uniformly distributed in infinitesimally thin films around the chromite particles of the ore, the quantity of alumina used being in excess of the theoretical chemical requirements for the conversion of the magnesia and of the silica of the magnesium silicate of the ore into spinel and mullite.

4. The process of making a refractory brick which comprises exposing chrome ore and a quantity of alumina for a time to a temperature of at least 3100° F. followed by cooling by virtue of which the magnesium silicate secondary component of the ore has been chemically converted into crystalline spinel and mullite uniformly distributed in infinitesimally thin films around the chromite particles of the ore, the quantity of alumina used being in excess of the theoretical chemical requirements for the conversion of the magnesia and of the silica of the magnesium silicate of the ore into spinel and mullite; grinding the resulting material; tempering the ground material; shaping it into bricks; and finally burning the shaped material while in brick form.

5. A refractory brick comprising chromite, spinel and mullite.

GILBERT E. SEIL.